United States Patent [19]

Nakashima et al.

[11] Patent Number: 5,259,355
[45] Date of Patent: Nov. 9, 1993

[54] GASEOUS FUEL FLOW RATE DETECTING SYSTEM

[75] Inventors: Akihiro Nakashima, Chiryu; Hisashi Iida, Aichi; Shigenori Isomura, Kariya; Hideki Koseki, Aichi; Takao Tsuji, Tokai, all of Japan

[73] Assignees: Nippondenso Co., Ltd., Kariya-City; Ubukata Industries Co., Ltd., Nagoya, both of Japan

[21] Appl. No.: 864,728

[22] Filed: Apr. 7, 1992

[30] Foreign Application Priority Data

Apr. 8, 1991 [JP] Japan .................. 3-075414

[51] Int. Cl.⁵ .................. G01F 1/28; F02M 33/02
[52] U.S. Cl. .................. 123/520
[58] Field of Search ............ 123/516, 518, 519, 520, 123/521, 198 D; 73/118.1

[56] References Cited

U.S. PATENT DOCUMENTS

| | | | |
|---|---|---|---|
| 4,794,790 | 1/1989 | Margarit-Metaza et al. | 73/117.3 |
| 4,862,856 | 9/1989 | Yokoe et al. | 123/519 |
| 4,926,825 | 5/1990 | Ohtaka et al. | 123/520 |
| 4,949,695 | 8/1990 | Uranishi et al. | 123/520 |
| 5,054,454 | 10/1991 | Hamburg | 123/520 |
| 5,080,078 | 1/1992 | Hamburg | 123/519 |
| 5,111,796 | 5/1992 | Ogita | 123/518 |
| 5,139,001 | 8/1992 | Tada | 123/520 |
| 5,143,035 | 9/1992 | Kayanuma | 123/198 D |
| 5,146,902 | 9/1992 | Cook et al. | 123/198 D |
| 5,158,054 | 10/1992 | Otsuka | 123/198 D |
| 5,190,014 | 3/1993 | Suga et al. | 123/1 A |
| 5,193,511 | 3/1993 | Fujino | 123/520 |
| 5,193,512 | 3/1993 | Steinbrenner et al. | 123/520 |
| 5,195,495 | 3/1993 | Kitamoto et al. | 123/520 |
| 5,195,498 | 3/1993 | Siebler et al. | 123/520 |
| 5,197,442 | 3/1993 | Blumenstock et al. | 123/520 |
| 5,205,263 | 4/1993 | Blumenstock et al. | 123/518 |

FOREIGN PATENT DOCUMENTS

| | | |
|---|---|---|
| 63-236922 | 10/1988 | Japan . |
| 1-180620 | 12/1989 | Japan . |
| 2-102360 | 4/1990 | Japan . |
| 2-130255 | 5/1990 | Japan . |
| 2-130256 | 5/1990 | Japan . |
| 2-136558 | 5/1990 | Japan . |
| 3-3958 | 1/1991 | Japan . |
| 3-26862 | 2/1991 | Japan . |

Primary Examiner—Willis R. Wolfe
Assistant Examiner—Thomas Moulis
Attorney, Agent, or Firm—Cushman, Darby & Cushman

[57] ABSTRACT

A fuel evaporative emission flow rate detecting system is capable of detecting a small flow rate of the fuel evaporative emission. The system includes an electromagnetic valve (22) in a communication passage (21). The pressure of the fuel evaporative emission in the fuel tank is detected by means of a magnetic flux detector or so forth. A control circuit is responsive to the pressure of the fuel evaporative emission reaching 15 mmHg, for example, while the communication passage (21) is held closed, to open the communication passage (21). On the other hand, the control circuit closes the communication passage when the pressure of the fuel evaporative emission becomes lower than or equal to 8 mmHg. Depending on a period, in which the communication passage (21) is held open, the flow rate of the fuel evaporative emission is calculated.

3 Claims, 9 Drawing Sheets

GASEOUS FUEL FLOW RATE DETECTING SYSTEM

BACKGROUND THE INVENTION

The present invention relates generally to a detecting system for detecting fuel gas flow rate.

In the automotive technology, evaporative emission control systems have been known in the art. Such systems are designed for preventing fuel gas generated in fuel tanks from being discharged to atmosphere. Namely, fuel gas generated in the fuel tank is introduced into a canister so as to be absorbed by activated carbon therein. The fuel evaporative emission is then introduced into an air induction passage of an engine through a fuel gas purge passage for combustion in the engine. Furthermore, in Japanese Unexamined Patent Publication (Kokai) 2-136558, there is disclosed a self-diagnosis system in the evaporative emission control system. The self-diagnosis system operates a purge valve disposed in the evaporative emission purge passage when the pressure in the fuel tank is higher than or equal to a predetermined pressure, to make judgement whether abnormality is present or not based on variation of an air/fuel ratio. Namely, in the self-diagnosis system, judgement whether abnormality, such as blocking of the purge passage and so forth, is present or not, after assuring generation of the fuel evaporative emission. Therefore, it is possible to employ a fuel gas flow rate detecting device in place of a pressure sensor for detecting the internal pressure of the fuel tank. As a flow rate sensor for substantially small flow rate, it may be possible to measure substantially small flow rate of fuel gas employing a strain gauge as proposed in Japanese Unexamined Patent Publication No. 63-236922 and Japanese Unexamined utility Model Publication No. 1-180620, for example.

However, in the system employing such a strain gauge to detect the flow rate from its small deformation magnitude, it is required to prepare a strain gauge which was manufactured with a substantially high accuracy, for obtaining a satisfactorily high sensitivity. Therefore, this method lacks practical applicability. Reference may be made to copending U.S. Patent application entitled "Self-diagnosis system in evaporated fuel gas distribution preventing system" filed on basis of Japanese patent application No. 3-75413 (of the filing date Apr. 8, 1991); and copending U.S. patent application entitled "FUEL EVAPORATIVE EMISSION AMOUNT DETECTION SYSTEM" filed on basis of Japanese patent application No. 3-79763 (of the filing date Apr. 12, 1991), respectively filed in behalf of Nippon Denso Co., Ltd. (the assignee of the present application).

SUMMARY OF THE INVENTION

It is an object of the present invention to provide a fuel evaporative emission flow rate detecting system in a novel method enabling detection of small flow rate of the fuel evaporative emission.

According to one aspect of the invention, a detecting system for flow rate of a fuel evaporative emission, comprises:

means, provided in a communication passage between a fuel tank and a canister incorporating an absorbent for absorbing the fuel evaporative emission of the fuel tank, for opening and closing the communication passage;

gas pressure detecting means for detecting the pressure of the fuel evaporative emission in the fuel tank and comparing the detected pressure with a first set value and a second set value;

control means for operating the opening and closing means to open the communication passage to feed the fuel evaporative emission to the canister when the pressure of the fuel evaporative emission detected by the gas pressure detecting means reaches the first value in the closing condition of the communication passage, and to close the communication passage when the pressure of the fuel evaporative emission detected by the gas pressure detecting means becomes lower than or equal to the second set value which is lower than the first set value; and means for calculating a flow rate of the fuel evaporative emission from the fuel tank to the canister based on a period in which the communication passage is held open.

When the pressure of the fuel evaporative emission detected by the gas pressure detecting means becomes the first set value while the communication passage is held closed, the opening and closing means is actuated to open the communication passage to supply the fuel evaporative emission to the canister. When the pressure of the fuel evaporative emission detected by the gas pressure detecting means becomes lower than or equal to the second set value which is lower than the first set value, the opening and closing means closes the communication passage. Based on the period, in which the communication passage is held open, the flow rate of the fuel evaporative emission from the fuel tank to the canister can be calculated. Namely, the communication passage is opened after rising of the fuel evaporative emission in the fuel tank by closing the communication passage. By this the pressure of the fuel evaporative emission to be detected can be amplified in comparison with that simply detecting the pressure of the fuel evaporative emission in the fuel tank.

DESCRIPTION OF THE PREFERRED EMBODIMENT

Figure 1:
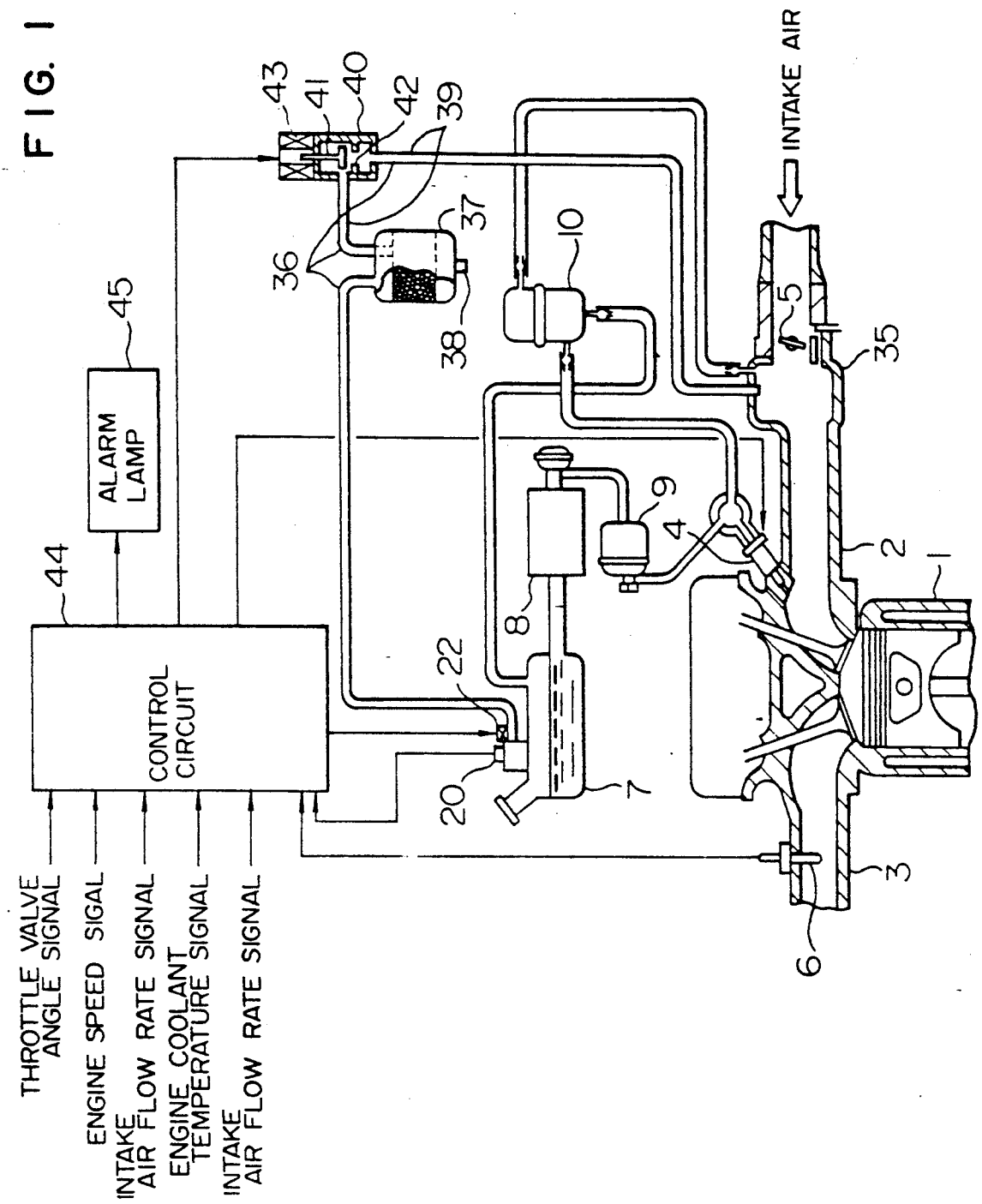
FIG. 1 is a diagrammatic illustration showing the preferred embodiment of an automotive internal combustion engine with accessories thereof, according to the present invention.

A multi-cylinder engine 1 is mounted on a vehicle as a prime mover, as shown in FIG. 1. To the engine 1, an air induction tube 2 (induction passage) and an exhaust pipe 3 are connected. Electromagnetic fuel injection valves 4 are provided in an intake manifold of the air induction tube 2. Also, a throttle valve 5 is provided in the air induction tube 2. On the other hand, an $O_2$ sensor 6 as an air/fuel ratio detecting means is provided in the exhaust tube 3. The $O_2$ sensor is designed to produce a voltage signal depending upon the oxygen concentration in the exhaust gas.

A fuel system for supply fuel to the fuel injection valves 4, includes a fuel tank 7, a fuel pump for circulating a pressurized fuel through a fuel supply circuit including a fuel filter 9, to the fuel injection valves 4.

Figure 2:
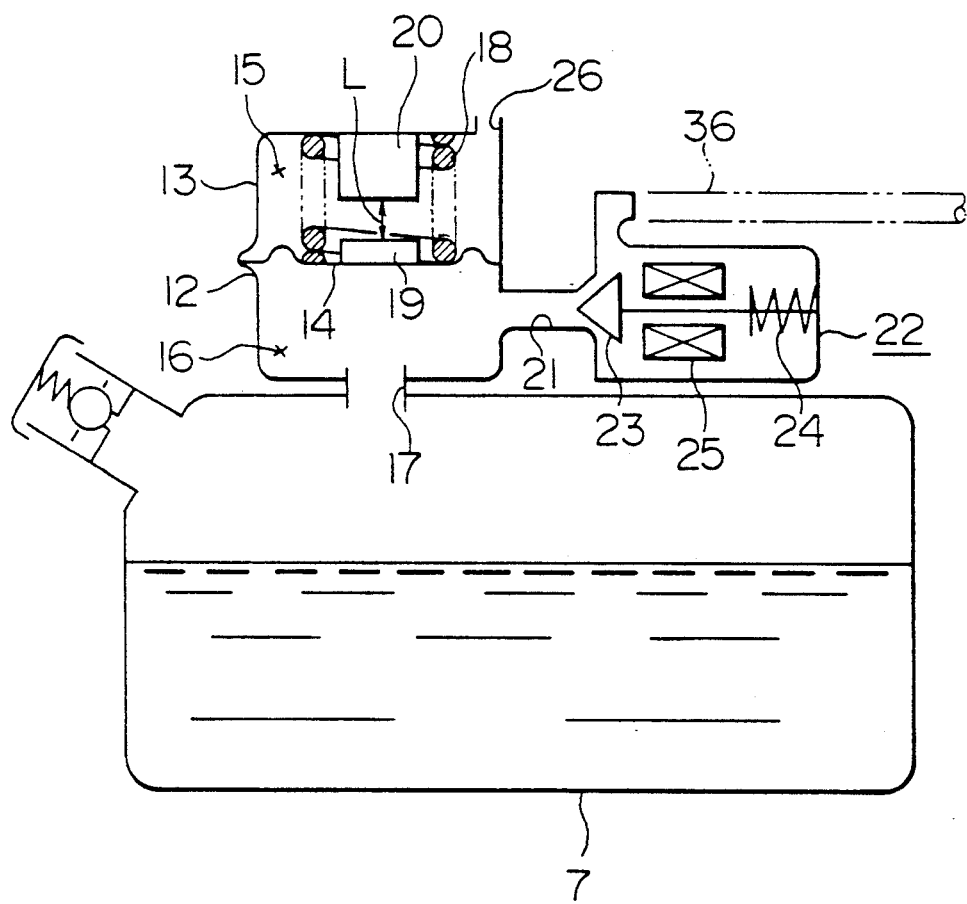
FIG. 2 is a section of a fuel tank in the fuel system in the engine of FIG. 1.

As shown in FIG. 2, a sensor housing 12 is fixedly secured on the upper surface of the fuel tank 7. A diaphragm chamber 13 is defined within the sensor housing 12. The diaphragm chamber 13 is divided into upper and lower chambers 15 and 16 by a diaphragm 14. The lower chamber 16 is communicated with the interior space of the fuel tank 7 through a communication aperture 17. On the other hand, a spring 18 is disposed within the upper chamber 15. The spring 18 exerts a spring force to the diaphragm 14 to urge the latter downwardly. A permanent magnet 19 is fixed to the diaphragm for movement according to deformation of the diaphragm. Opposing to the permanent magnet 19, a magnetic flux detector 20 is mounted on the inner surface of the ceiling of the sensor housing 12. The magnetic flux detector 20 thus generates a signal corresponding to a distance L to the permanent magnet 19. It should be noted that, as the magnetic flux detector 20, a MR element or hole element can be employed.

When the fuel evaporative emission is generated in the fuel tank 7, a force corresponding to the pressure in the fuel tank is exerted on the diaphragm 14 to cause upward shifting thereof. According to deformation of the diaphragm 14, the permanent magnet 19 moves upwardly. The magnetic flux detector 20 then generate an electric signal corresponding to the shifting magnitude (distance L) of the permanent magnet.

Furthermore, a communication path 21 is formed in the lower chamber 16. The communication path 21 includes an electromagnetic valve 22 as an opening and closing means arranged therein. The electromagnetic valve 22 includes a valve body 23 which is normally biased for closing the communication path 21 by means of a spring 24. An actuator coil 25 is provided in cooperation with the valve body 23 so that it may shift the valve body 23 against the spring force of the spring 24 for opening the communication path 21, when it is energized. On the other hand, the upper chamber 15 is communicated with an atmosphere through an atmosphere communication opening 26.

The communication passages 26 and 21 are communicated with a surge tank 35 in the induction system through a purge pipe 36. A canister 37 containing activated carbon as an absorbent is disposed at the intermediate portion of the purge pipe 36. The fuel evaporative emission in the fuel tank 7 is absorbed by the activated carbon in the canister 37. On the other hand, for the canister 37, a fresh air induction opening 38 is formed to introduce a fresh air. The purge pipe 36 at the side of the surge tank 35 relative to the canister 37 serves as discharge passage 39. At the intermediate position in the discharge passage 39, an electromagnetic valve 40 for purging (hereafter referred to as "purge valve") is provided.

The purge valve 40 has a valve body 41 which is normally biased to be positioned away from a valve seat 42 by a spring (not shown) so as to normally maintain the valve open. An actuator coil 43 is associated with the valve body 41 so that it may urge the valve body 41 onto the valve seat 42 to close the valve. Accordingly, the discharge passage 39 is held open while the purge valve 40 is held deenergized and is closed when the purge valve 39 is energized.

A control circuit 44 including a microcomputer receives a throttle valve angle position signal from a throttle sensor (not shown) which monitors angular position of a throttle valve 5, an engine speed signal from an engine speed sensor (not shown) which monitors revolution speed of the engine 1, an intake air flow rate signal from an air flow sensor (not shown) for monitoring flow rate of an intake air, an engine coolant temperature signal from a coolant temperature sensor (not shown) for monitoring a temperature of an engine coolant, and an intake air temperature signal from an intake air temperature sensor (not shown) for monitoring a temperature of an intake air. The control circuit 44 detects the angular position of the throttle valve 5, an engine speed, an intake air flow rate, an engine coolant temperature and an intake air temperature from these signals.

Figure 3:
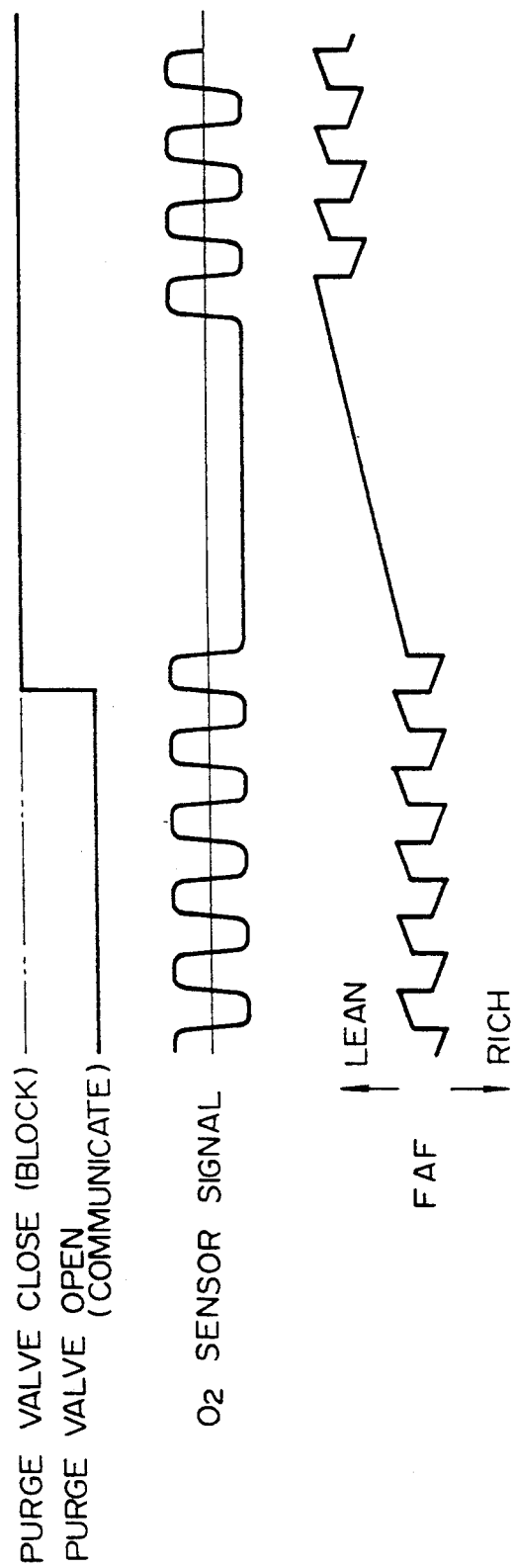
FIG. 3 is a timing chart showing manner of processing of a sensor signal.

On the other hand, the control signal receives a signal from the $O_2$ sensor 6 to make judgement for rich and lean of the air/fuel mixture The control circuit 44 is responsive to variation of the air/fuel ratio from rich side to lean side or from lean side to rich side across stoichiometric value, to vary a feedback correction coefficient FAF ($\lambda$ control coefficient) in stepwise fashion for increasing and decreasing the fuel injection amount, as shown in FIG. 3. It should be noted that the air/fuel ratio dependent feedback control is not performed at a cold engine condition, in which the engine coolant temperature is low, or at high load and high speed condition of the engine. The control circuit 44 also derives a basic fuel injection period Tp on the basis of the engine speed and the intake air flow rate (as a representation of the engine load). The basic fuel injection period is corrected by the feedback correction coefficient and other known correction values to derive a final fuel injection period to perform fuel injection at a given fuel injection timing through the fuel injection valves 4.

The control circuit 44 receives the signa from the magnetic flux detector 20. Furthermore, the control circuit 44 is connected to the electromagnetic valve 22 and the purge valve 40 to control for opening and closing. Furthermore, an alarm lamp 45 is provided on an instrument panel of the vehicle.

Figure 7:
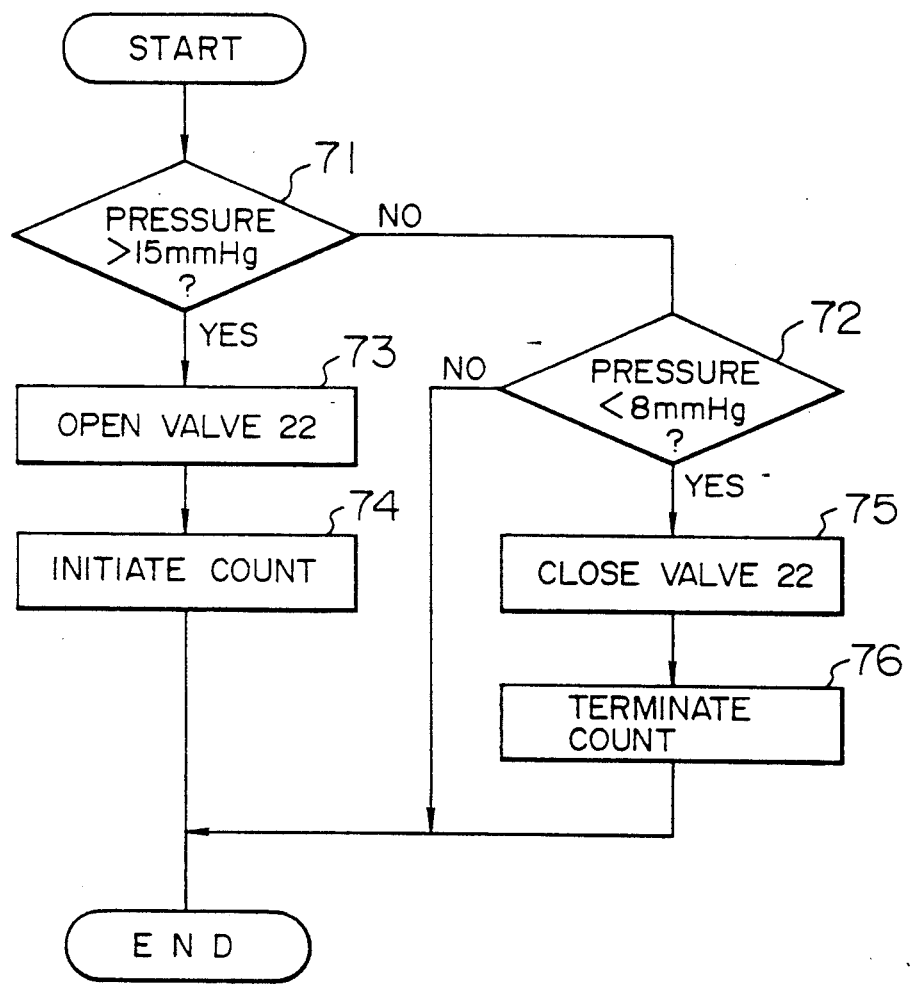
FIG. 7 in a flowchart showing a further operation for detecting a flow rate of fuel gas according to the embodiment.

Next, the operation of the evaporative emission control system, thus constructed will be discussed herebelow. FIG. 7 is a flowchart showing an operation for detecting a flow rate of evaporated fuel gas.

Figure 4:
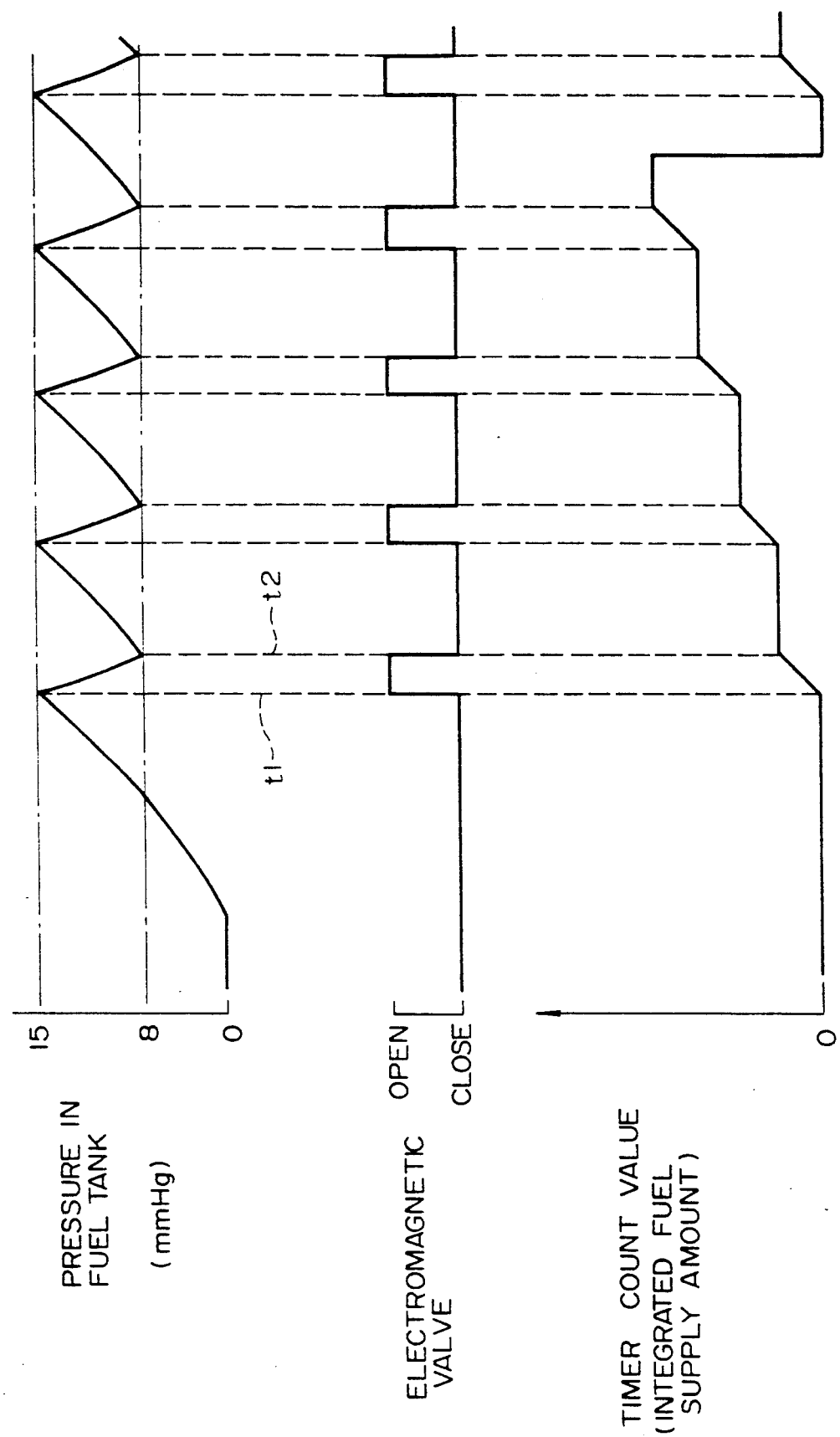
FIG. 4 is a timing chart showing manner of processing of the sensor signal.
Figure 5:
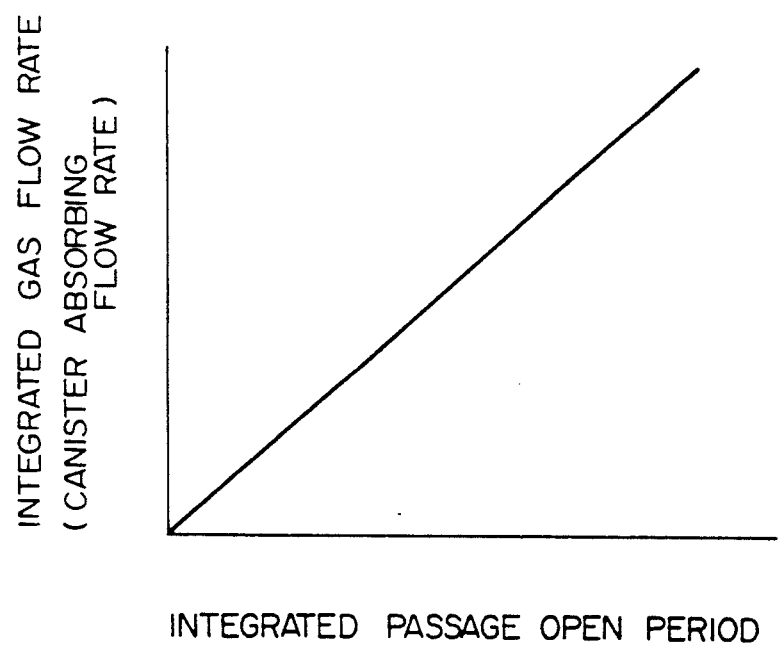
FIG. 5 is a graph showing relationship between an integrated time of opening of a passage and an integrated gas flow rate.

On the normal condition, the electromagnetic valve 22 is closed. When the fuel in the fuel tank 7 is evaporated, the pressure in the fuel tank 7 rises since the interior space of the fuel tank 7 is enclosed in gas tight fashion. The internal pressure of the tank acts on the diaphragm 14 to cause deformation thereof. The permanent magnet 19 rigidly attached to the diaphragm 14 is thus shifted upwardly to approach the magnetic flux detector 20. The magnetic flux detector 20 outputs the electric signal having the magnitude corresponding to the distance to the permanent magnet. The control circuit 44 makes judgement whether the internal pressure in the tank reaches 15 mmHg and 8 mmHg (step 71 and 72 of FIG. 7), as shown in FIG. 4.

When the internal pressure of the tank reaches 15 mmHg (timing t1 of FIG. 4), the control circuit 44 operates the electromagnetic valve 22 to open (step 73 of FIG. 7) and, at the same time, initiate counting operation for the valve open period (step 74 of FIG. 7).

By opening of the electromagnetic valve 22, the internal pressure in the fuel tank 7 is lowered. Accordingly, the diagram 14 is lowered toward the initial position. When the internal pressure of the tank becomes 8 mmHg (timing t2 in FIG. 2), the control circuit 44 operates the electromagnetic valve 22 to close (step 75 of FIG. 7) and terminate counting operation for measurement of the valve open period (step 76 of FIG. 7).

While the fuel temperature in the fuel tank 7 is risen and thus the fuel is continued to evaporate, the abovementioned operation is performed repeatedly. During this period, the valve open period of the electromagnetic valve 22 is integrated. The integrated period corresponds to the flow rate from the tank 7 to the canister 37.

Figure 6:
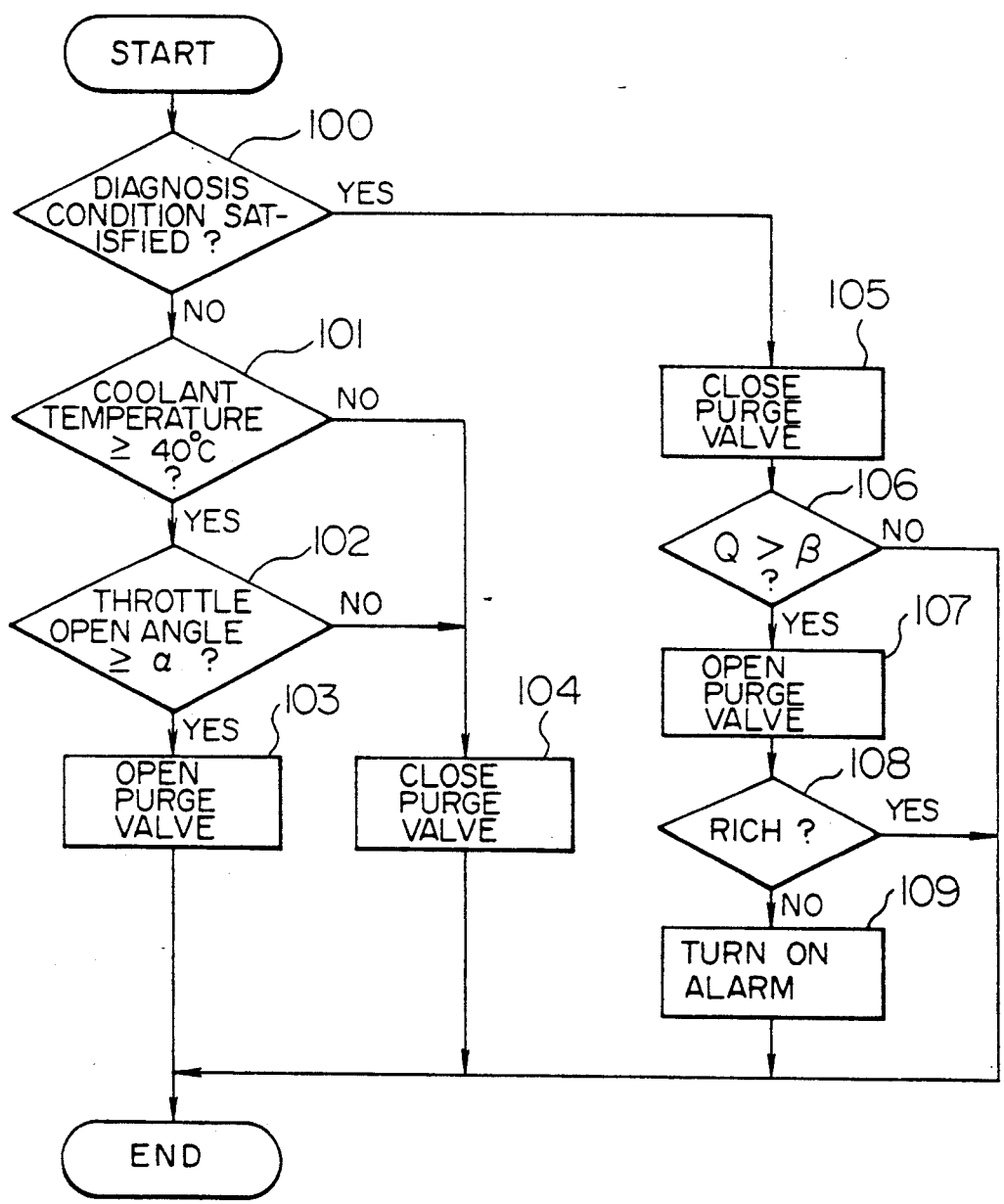
FIG. 6 is a flowchart showing operation of the preferred embodiment of the invention.

Next, discussion will be given for self-diagnosis by the control circuit 44. FIG. 6 shows control routine for the purge valve 40, which routine is executed periodically with a given time intervals.

The control circuit 44 is responsive to turning ON of an ignition switch to set an integrated gas flow rate Q to "0". Then, at a step 100, the control circuit 100 checks whether a diagnosis condition is satisfied or not. In the shown embodiment, the diagnosis condition is satisfied when the engine coolant temperature is higher than or equal to 80° C. and self-diagnosis is not yet performed after turning ON of the ignition switch. When the engine coolant temperature is lower than 80° C., check is performed whether the engine coolant temperature is higher than or equal to 40° C., at a step 101. If the engine coolant temperature is higher than or equal to 40° C., check is performed whether the throttle valve open angle is greater than or equal to α If the throttle valve open angle is greater than α the purge valve 40 is operated to open at a step 103. When the engine coolant temperature as checked at the step 101 is lower than 40° C. or the throttle valve open angle as checked at the step 102 is less than α then the purge valve 40 is closed at a step 104.

On the other hand, when the engine coolant temperature first rises to be higher than or equal to 80° C. after turning ON of the ignition switch at the step 100 and the diagnosis condition is satisfied, the control circuit 44 closes the purge valve 40 at a step 105. Then, the integrated gas flow rate Q is checked whether it is greater than or equal to β, at a step 106. When the integrated gas flow rate Q is greater than or equal to β, the control circuit 44 operates the purge valve 40 to open at a step 107. Thereafter, the control circuit 44 checks whether the feedback correction coefficient FAF is shifted toward rich mixture side in a given magnitude or not. If the feedback correction coefficient FAF is not shifted toward the rich mixture side (for adjusting the air/fuel mixture toward lean side), judgement is made that abnormality is caused. Then, at a step 109, an alarm lamp 45 is turned ON. Namely, when the system operates in normal condition, by opening the purge valve 40 after absorbing the fuel evaporative emission by the activated carbon with closing the purge valve 40, the fuel evaporated emission absorbed in the activated carbon is supplied to the air induction tube 2 to make the air/fuel ratio richer. Therefore, by opening the purge valve 40, the feedback correction coefficient FAF must be varied. If the feedback correction coefficient FAF is held unchanged, abnormality, such as blocking of the purge pipe 36 and so forth, can be judged.

As set forth, in the shown embodiment, the electromagnetic valve 22 is provided in the communication passage 21 between the fuel tank 7 and the canister 37. The pressure of the fuel evaporative emission in the fuel tank 7 is detected by the permanent magnet 19 associated with the diaphragm 14 and the magnetic flux detector 20 (gas pressure detecting means). The control circuit 44 controls the electromagnetic valve 22 so that when the pressure of the fuel evaporative emission reaches the first set value (15 mmHg) while the electromagnetic valve 22 is held closed, the electromagnetic valve 22 is opened to make the communication passage 21 conductive, and when the pressure of the fuel evaporative emission drops to the second set value (8 mmHg) lower than the first set value, the electromagnetic valve 22 is operated to close the communication passage 21. Based on the period to maintain the electromagnetic valve 22 open, the fuel evaporative emission is calculated. As a result, by opening the communication passage 21 after the pressure of the fuel evaporative emission is risen in the closed condition of the communication passage 21, the pressure to be detected can be amplified in comparison with that simply detecting the pressure of the fuel evaporative emission in the fuel tank. Accordingly, with this novel method, tiny fuel evaporative emission gas flow rate can be effectively detected.

It should be noted that the present invention is not specified to the embodiment discussed above. For example, though the foregoing embodiment controls the set pressure in the upper chamber 15 with reference to the atmospheric pressure by exposing to the atmosphere, it is equally possible to communicate the diaphragm chamber 13 and the purge pipe 36 to employ the internal pressure in the purge pipe as reference pressure.

Figure 8:
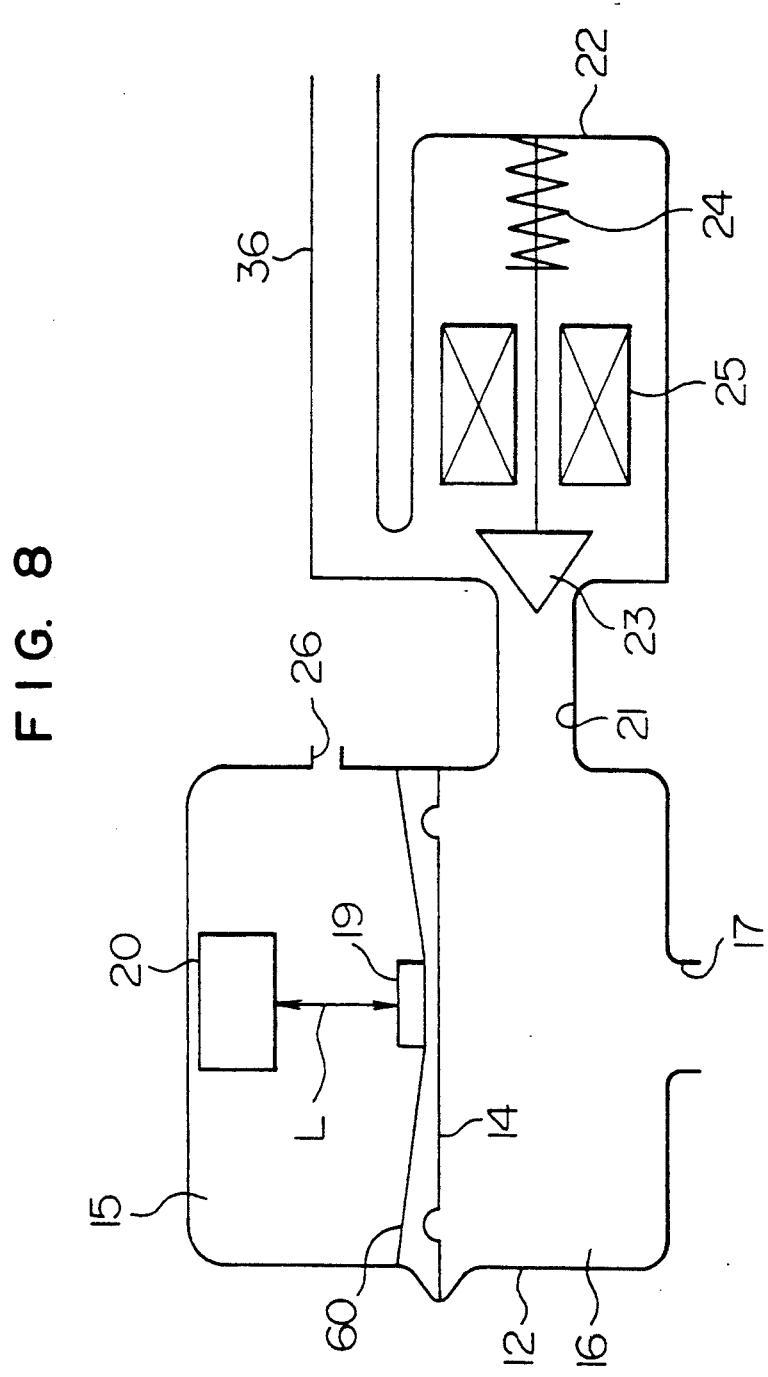
FIG. 8 is a section showing a further embodiment of a fuel evaporative emission flow rate detection system according to the present invention.
Figure 9:
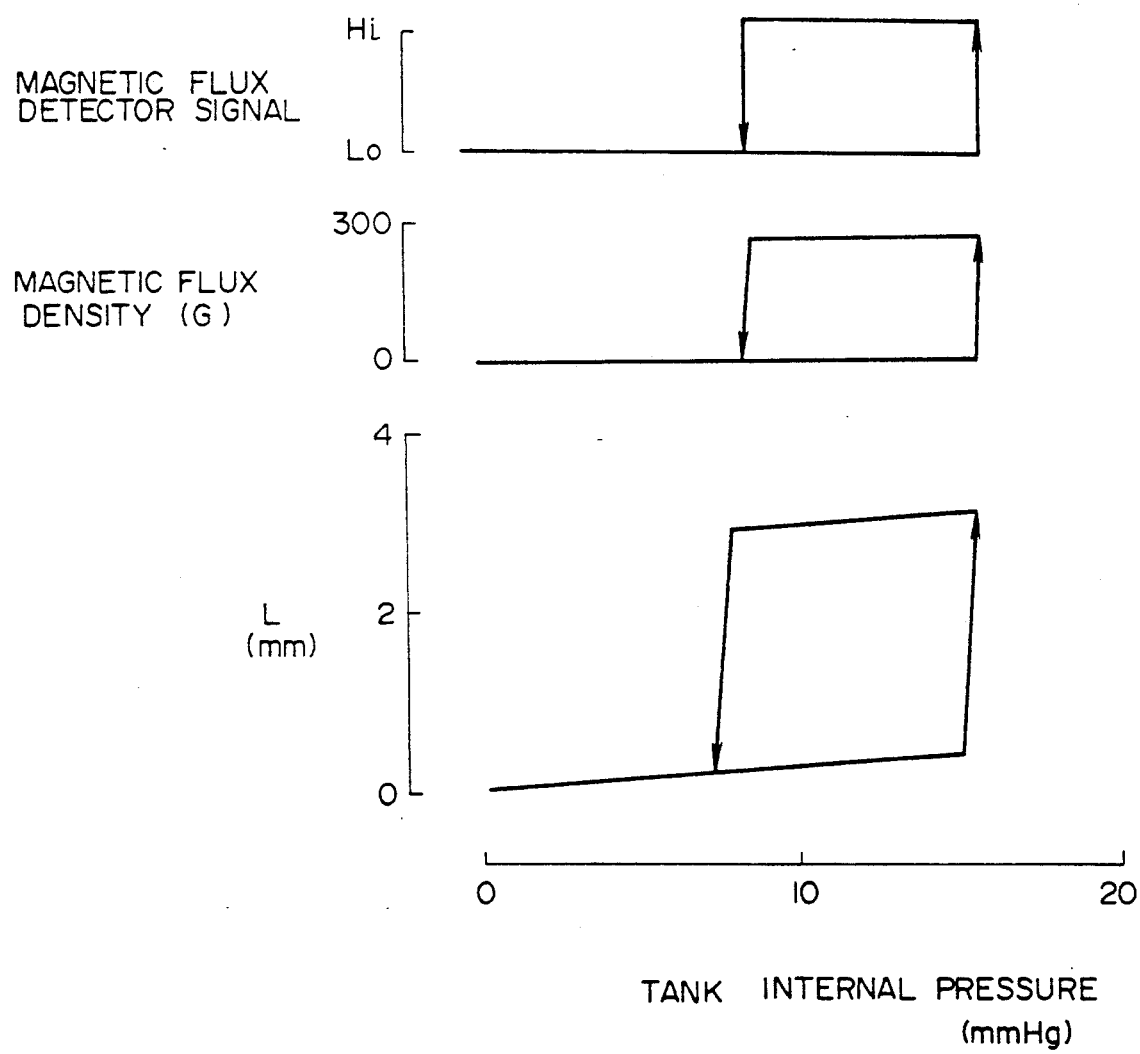
FIG. 9 is a chart showing operational characteristics of the embodiment of FIG. 8.

Furthermore, the present invention can also be implemented with the construction as shown in FIG. 8. Namely, a snap action disc 60 which has a hysteric characteristics on the diaphragm 14. The snap action disc 60 is reversed at a first set pressure and returns to the initial position at a second set pressure. The permanent magnet 19 is mounted on the snap action disc 60 in opposition to the magnetic flux detector 20. It should be noted that the magnetic flux detector 20 can be formed with a lead switch, MRIC, hole IC or so forth, which can generate high and low level signals, as shown in FIG. 9.

As set forth above, with the novel method according to the present invention, an excellent effect in detection of tiny flow rate of the fuel evaporative emission.

We claim:

1. A system for detecting a flow rate of evaporated fuel, comprising:
   fuel tank for storing fuel;
   a canister containing absorbent and adapted to absorb fuel gas evaporated from the tank fuel and supplied via communication passage with inner space of the fuel tank;

movable means provided in the communication passage for communicating the canister absorbent and tank inner space of the tank and adapted to move in response to pressure of the evaporated fuel gas;

opening and closing means responsive to the movable means and adapted to open the communication passage for supplying therethrough the evaporated fuel gas to the absorbent in response to fuel gas pressure higher than a first set value and adapted to close the communication passage for interrupting the supply of fuel gas in response to gas pressure not higher than a second set value not higher than the first value; and operation control means for detecting time period for the opening operation of the opening and closing means and calculating a flow rate of fuel gas supplied from the fuel tank to the canister.

2. A system according to claim 1, wherein said movable means comprises a movable diaphragm partitioning the outer atmosphere and inner space of the communication passage, and means provided on the diaphragm for generating a signal responsive to possible motion of the diaphragm, and said opening and closing means comprises electromagnetic valve means provided in the communication passage and controllable from said operation control means responsive to the response signal generated by the signal generation means.

3. A system according to claim 2, wherein said movable means further includes a snap action disk having a hysteresis to snap in response to a gas pressure higher than said first set value and reset in response to a gas pressure not higher than said second set value.

* * * * *